United States Patent
Dvorscak, Jr. et al.

(10) Patent No.: US 11,055,645 B2
(45) Date of Patent: Jul. 6, 2021

(54) METHOD AND SYSTEM FOR OPTIMIZING DISTRIBUTION OF INCENTIVE BUDGET FOR ADDITIONAL TIME INTERVAL ALLOCATION IN A MULTI-WEEK WORK SCHEDULE

(71) Applicant: NICE LTD, Ra'anana (IL)

(72) Inventors: Robert Michael Dvorscak, Jr., Dallas, TX (US); Charles William Gulledge, Richardson, TX (US); Rob Harris Duplantis, Frisco, TX (US)

(73) Assignee: NICE LTD, Ra'anana (IL)

( * ) Notice: Subject to any disclaimer, the term of this patent is extended or adjusted under 35 U.S.C. 154(b) by 131 days.

(21) Appl. No.: 16/439,716

(22) Filed: Jun. 13, 2019

(65) Prior Publication Data
US 2020/0394594 A1 Dec. 17, 2020

(51) Int. Cl.
*G06Q 10/06* (2012.01)
*G06N 20/00* (2019.01)
*G06Q 10/04* (2012.01)

(52) U.S. Cl.
CPC ..... *G06Q 10/063116* (2013.01); *G06N 20/00* (2019.01); *G06Q 10/04* (2013.01); *G06Q 10/06315* (2013.01)

(58) Field of Classification Search
CPC ............................................... G06Q 10/00–50
See application file for complete search history.

(56) References Cited

U.S. PATENT DOCUMENTS

| 8,401,884 B1* | 3/2013 | Kinney | G06Q 10/063116 705/7.18 |
| 2009/0119126 A1* | 5/2009 | Johnson | G06Q 10/063116 705/2 |
| 2011/0054972 A1* | 3/2011 | Hayden | G06Q 10/06 705/7.42 |

(Continued)

OTHER PUBLICATIONS

Broos Maenhout, Mario Vanhoucke, An integrated nurse staffing and scheduling analysis for longer-term nursing staff allocation problems, Omega, vol. 41, Issue 2 (Year: 2013).*

(Continued)

*Primary Examiner* — Arif Ullah
(74) *Attorney, Agent, or Firm* — Soroker Agmon Nordman

(57) ABSTRACT

A computer-implemented method for optimizing distribution of incentive-budget for additional time interval allocation in a multi-week work schedule is provided herein. The computer-implemented method comprising: (i) training a model to forecast future net staffing; (ii) generating a multi-week work schedule; (iii) using the model to forecast for each time interval a net staffing value; (iv) classifying time intervals as understaffed; (v) displaying the understaffed time intervals to suggest agents to take as additional time interval; (vi) providing a tier incentive structure and an incentive budget to be updated by a user; (vii) training the model to forecast a degree of elasticity of agents demand for each time interval based on historical agents schedule changes; and (viii) calculating a combination of incentives of each tier of the tier incentive structure in the incentive-budget to accommodate understaffed time intervals and maximize agents demand for time intervals based on forecasted degree of elasticity.

8 Claims, 6 Drawing Sheets

(56) References Cited

U.S. PATENT DOCUMENTS

2018/0261319 A1* 9/2018 Bowie ................... G16H 40/20
2019/0304595 A1* 10/2019 Bergman ............... G16H 40/20

OTHER PUBLICATIONS

Ashiru O, Polak JW, Noland RB. Utility of Schedules: Theoretical Model of Departure-Time Choice and Activity-Time Allocation with Application to Individual Activity Schedules. Transportation Research Record. 2004;1894(1):84-98. doi:10.3141/1894-10 (Year: 2004).*

* cited by examiner

METHOD AND SYSTEM FOR OPTIMIZING DISTRIBUTION OF INCENTIVE BUDGET FOR ADDITIONAL TIME INTERVAL ALLOCATION IN A MULTI-WEEK WORK SCHEDULE

FIELD OF THE INVENTION

The present disclosure relates generally to computerized systems and methods for managing and scheduling staff in environments where workload fluctuates. To adequately staff time intervals of high workload, incentivizes might be offered to the employees for extra hours. More specifically, the present disclosure relates to a method and system for optimizing distribution of an incentive budget for time intervals in a work schedule which are forecasted to be understaffed.

BACKGROUND OF THE INVENTION

In workplaces, having thousands of agents, where workload fluctuates, such as call-centers, optimized staff scheduling, and rostering is essential to both business profit and quality of customer service. The quality of customer service may deteriorate when the call-center is understaffed, that is, when a certain number of customers is waiting for service for a certain amount of time. However, not only the need to meet customers demand in a cost-effective manner is important, but agents' satisfaction is also significant, Addressing agents' personal issues such as shifts preferences or part-time work or simply having better work-life balance may contribute to agents' satisfaction.

To address both understaffed time intervals issues and agents' personal issues, after at system for Work Force Management (WFM) has generated a work schedule, where each shift in the work schedule is divided into time intervals, agents are provided the option to trade shifts with other agents or add extra time intervals to their shift. The offered time intervals may be presented to agents in various authorization levels, according to their necessity, i.e., net staffing variance, as some time intervals may require more agents than other time intervals due to expected high customer-service volume.

To encourage agents to take additional time intervals to their scheduled shift, these time intervals may be marked as pre-approved by a supervisor or administrator and even manually incentivized according to a predetermined multi-tier incentive budget. However, currently, time intervals are incentivized based solely on current net staffing data. Thus, the incentive budget is not optimally distributed i.e., does not achieve the greatest change in expected forecast, because incentives might be wasted on time intervals that may have otherwise been accepted by agents without the incentive. Or alternatively, time intervals with low agents demand, might be incentivized and other time intervals with the same net staffing value and higher agents demand might not be incentivized.

Accordingly, it is desirable to take agents demand for a time interval into account and via platforms such as Employee Engagement Manager (EEM) to incentivize agents to increase the likelihood that they will take a given interval to align agents' priorities i.e., receiving extra pay/points, with the priorities of the business i.e., staffing of forecasted understaffed time intervals. In other words, there is a need for a system and method for optimizing distribution of an incentive budget for extra time interval allocation in a multi-week work schedule in real-time based on net staffing values and agents demand for the time intervals. The best case would be that the agents take all of the needed intervals.

SUMMARY OF THE INVENTION

There is thus provided, in accordance with some embodiments of the present invention a computer-implemented method for optimizing distribution of incentive-budget for additional time interval allocation in a multi-week work schedule is provided herein. The computer-implemented method comprising: (i) using machine learning algorithm to train a model to forecast future net staffing based on historical data; (ii) generating a multi-week work schedule having a predetermined amount of time intervals; (iii) using the model to forecast for each time interval a net staffing value; (iv) classifying time intervals in the multi-week work schedule as understaffed based on the forecasted net staffing (v) displaying the time intervals that were classified as understaffed to suggest agents to take as additional time interval to their schedule via a display unit; (vi) providing a tier incentive structure and an incentive budget to be updated by a user via a user interface; (vii) using machine learning algorithm to train the model to forecast a degree of elasticity of agents demand for each time interval in the multi-week period of the work schedule based on historical agents schedule changes; and (viii) calculating a combination of incentives of each tier of the tier incentive structure in the incentive-budget to accommodate understaffed time intervals and maximize agents demand for time intervals based on forecasted degree of elasticity, thus, optimizing the distribution of incentive-budget for additional time interval allocation in the multi-week work schedule.

Furthermore, in accordance with some embodiments of the present invention, the historical data comprises of monitored agents schedule changes over predetermined number of weeks or net staffing value.

Furthermore, in accordance with some embodiments of the present invention, the method may include using the model to simulate various incentive combinations of incentives from each tier of the tier incentive structure in the incentive-budget to further train the model to determine degree of the elasticity of agents demand for a time interval in the multi-week period.

Furthermore, in accordance with some embodiments of the present invention, the method may include using the model to simulate various incentive combinations of incentives from each tier of the tier incentive structure in the incentive-budget to select the combination of incentives of each tier of the tier incentive structure that will achieve the greatest change in expected forecast.

Furthermore, in accordance with some embodiments of the present invention, the incentive-budget is not fully exploited or may not be utilized at all.

Furthermore, in accordance with some embodiments of the present invention, the method may include offering to agents to elect incentivized time intervals according to the calculated combination of incentives via a user interface.

Furthermore, in accordance with some embodiments of the present invention, the method may include adding the agents schedule changes due to the offered incentivized time interval to the historical data.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION OF THE INVENTION

Figure 1:
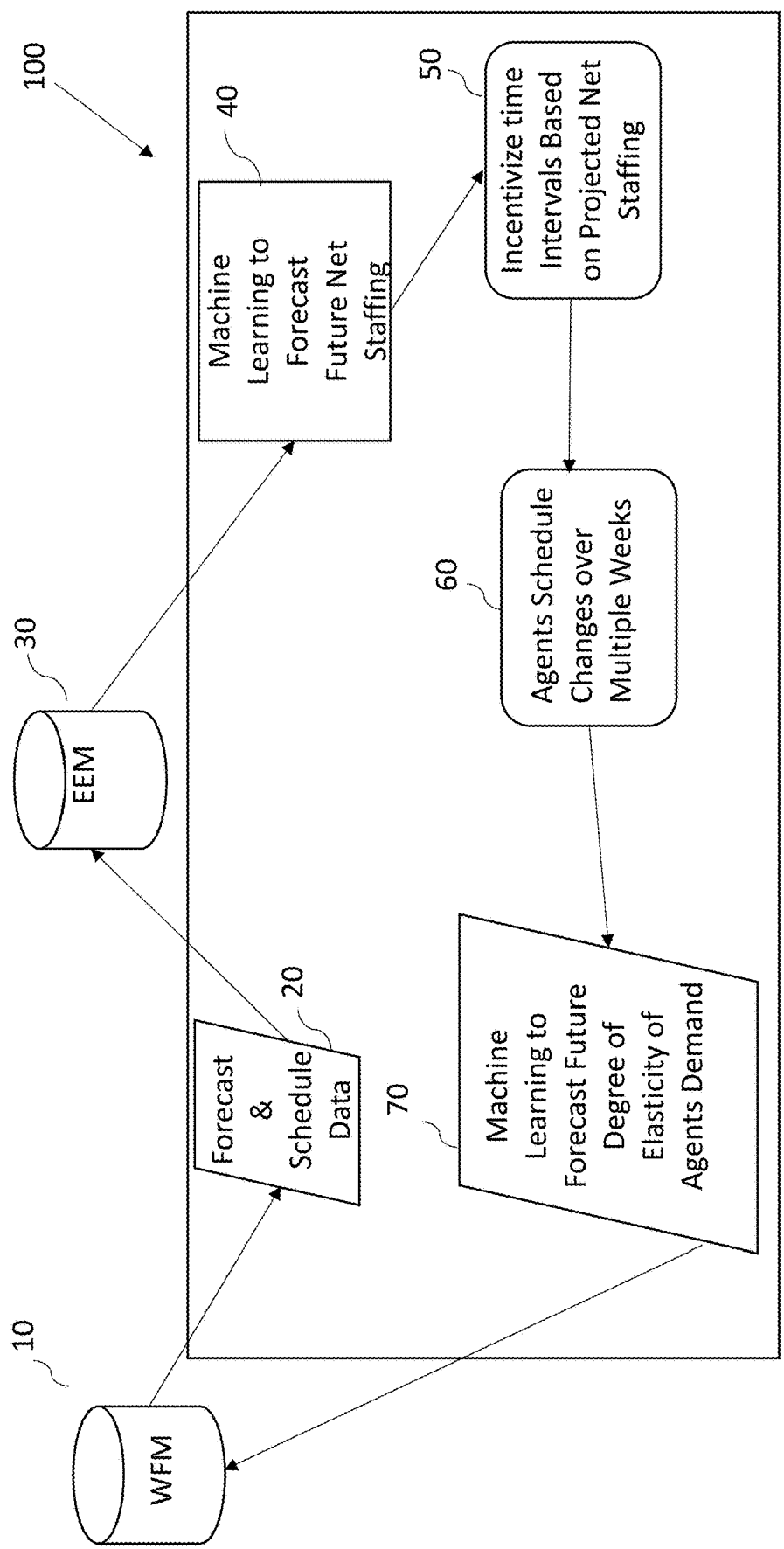
FIG. 1 schematically illustrates a module for optimizing distribution of incentive budget for additional time interval allocation in a multi-week work schedule, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities the computer's registers and for memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Currently, there are no systems or methods to distribute an incentive budget over time intervals in a work schedule, based on agents' past behavior i.e., historical schedule changes or based on analyzed historical demand of agents to the time intervals Incentivized time intervals today are based solely on current net staffing variance, thus a portion of the incentives-budget or even the whole incentives-budget might be wasted on time intervals that may have otherwise been accepted by agents without the incentive. Therefore, the concern would be that time intervals with high demand are unnecessarily incentivized over those with low demand. In another case, incentive budget might be wasted when time intervals are incentivized based on net staffing value only, because when one or more time intervals have the same forecasted understaffed net staffing value, i.e., these one or more time intervals are of low yet different agents demand, then time intervals with lower agents demand might be incentivized instead of time intervals with higher agents demand. That is, incentivizing time intervals with lower agents demand would be a waste, compared to incentivizing time intervals with higher demand, as these would be more easily staffed by offering the incentive.

The system and method provided according to some embodiments of the present disclosure, enable optimized distribution of incentive budget for extra time intervals in a work schedule by taking into account the net staffing: value and the predicted agents demand for each time interval in the work schedule.

Therefore, by training a model to predict net stalling value and agents demand for each time interval, the provided system and method solves the problem of incentives waste. Incentives may be wasted on either time intervals that agents would have taken even without the incentive or time intervals with low elasticity where agents demand is not likely to change due to increase in the amount of the incentive. The problem is solved by calculating a combination of time intervals that get the most change out of the specified incentive budget with allotted incentives in a tier incentive structure. In other words, the problem is solved by calculating the combination of time intervals and their associated tier of incentive that would be the hardest to fill otherwise. The consequence of applying the solution to the problem is further having the incentive budget spent on solving the problem in a distributed manner instead of solving it in a concentrated or spotty manner.

As used herein, the term "work schedule" refers to the days and hours an employee works on a weekly basis.

As used herein, the term "time interval" refers to a specific period of time that can be scheduled in a work schedule.

As used herein, the term "time horizon" refers to the number of weeks from today.

As used herein, the term "staffed" refers to the number of people scheduled to work in a given time interval.

As used herein, the term "requirements" refers to the number of people needed to answer all expected inbound contacts for a call center in a given time interval. The expected inbound contacts may come in via calls, SMS, email, chat, video, etc.

As used herein, the term "net staffing" refers to the difference in the number of people staffed and the number of people needed in a certain time interval.

As used herein, the term "Workforce Management System (WFM)" refers to desktop and mobile applications to assist businesses to create a work schedule for a certain period. WFM forecasts and schedules agents and updates forecasts based on variance between actual events and forecasted events potentially indicating a need for extra hours.

As used herein, the term "Employee Engagement Manager (EEM)" refers to desktop and mobile applications to allow agents to stew or change schedules anywhere, at any time via any browser or a smartphone application. The EEM user interface is continually updated to reflect projected demand. EEM currently uses updates from WFM to suggest specific agents for extra hours. It also equips managers with a dashboard to monitor agent intraday performance to better manage performance.

As used herein, the term "incentive" refers to a reward to be allocated to an agent when adding a given time interval to a certain scheduled shift.

As used herein, the term "incentive budget" refers to the total number of rewards allotted for a predefined amount of time. In a non-limiting example, a couple of weeks.

As used herein, the term "elasticity" refers to how likely demand for something is to change given a change in supply.

As used herein, the term "elasticity of agents demand for a time interval" refers to how likely agents demand for a time interval change, given a change in the level of the incentive.

As used herein, the term "model" refers to a machine learning algorithm or technique that is generated through processing of historical data.

As used herein, the term "model training" refers to the process of providing a machine learning program with large-scale data for processing and to learn from so that the model will be able to perform a forecast.

As used herein, the term "agent" refers to an employee and vice versa.

As used, herein, the term "multiple-week" refers to a portion of a week one week or more.

FIG. 1 schematically illustrates a module for optimizing distribution of incentive budget for additional time interval allocation in a multi-week work schedule, in accordance with some embodiments of the present disclosure.

In some embodiments of the present invention, a machine learning algorithm to train a model to forecast future net staffing 40 and the machine learning algorithm to train the model to forecast a degree of elasticity of agents demand for each time interval in the multi-week period of a work schedule 70 may operate on a computerized system or may operate on a different computer at a different location communicating with the computerized system over a communication network.

In some embodiments of the present invention, the computerized system may communicate with a user interface or a web interface i.e., one or more web interfaces on a remote computer, for example, used by an agent or an administrator.

The computerized system may include a processor, a memory, a communication module and a user interface, an input device and an output device. The processor may include one or more processing units, i.e., of one or more computers. The processor may be configured to operate in accordance with programmed instructions which are stored in the memory. Furthermore, the processor may be capable of executing, the machine learning algorithm.

The processor may communicate with an output device. For example, the output device may include a computer monitor or screen. The processor may communicate with a screen of the output device to display, for example, a work schedule with suggested distributed tier incentive structure e.g., via EEM platform or application, and other suitable parameters which determine the incentive budget frame, the amount of incentive tiers and the value of each tier. In another example, the output device may include a printer, display panel speaker, or another device capable of producing visible, audible, or tactile output.

The processor may communicate with an, input device. For example, the input device may include one or more of a keyboard, keypad, or pointing device for enabling a user to inputting data or instructions for operation of the processor.

The processor may communicate with the memory. The memory may include one or more volatile or nonvolatile memory devices. The memory may be utilized to store, for example, programmed instructions for operation of the processor, data or parameters for use by the processor during operation, or results of operation of the processor. The memory may include databases WFM 10 and EEM 30 stored thereon. The data stored in the databases 10 and 30 may include, in part, historical data such as monitored agents schedule changes over predetermined number of weeks or net staffing value, work schedule, templates of Employee Engagement Mariaer (EEM) application, contact preference, time off preference, time on preference, request absence input parameters (date, code, start time and end time) and the like.

The memory may include a computer readable medium for storing program instructions for operation of the processor. In this example, the programmed instructions may take the form of EEM application/module, the form of WFM application/module or the form of a model to predict net staffing value and agents demand for each time interval which is running on the processor.

According to some embodiments of the disclosure, historical data stored on WFM database 10 may be used to forecast future net staffing value for each time interval in a work schedule. In a non-limiting example, a time interval may be 30 minutes and the number of weeks in the work schedule may be four weeks. The model 100 may generate a multi-week work schedule having a predetermined amount of time intervals based on the forecasted future net staffing.

According to some embodiments of the disclosure, the method may incentivize time intervals based on projected (forecasted) net staffing values 50. In operation, the processor may execute a method for optimizing distribution of incentive budget for additional time interval allocation in a multi-week work schedule, initially based on the forecasted net staffing value of each time interval. After data related to agents schedule changes has been aggregated over a specified number of weeks 60 and has been stored in the WFM database 10, using machine learning algorithm to train the model to forecast a degree of elasticity of agents demand for each time interval in the multi-week period of the work schedule 70 based on historical agents schedule changes.

According to some embodiments of the disclosure, the method may use the aggregated data that is related to agents schedule changes to forecast the elasticity of each time interval in a multi-week work schedule. The method may use the forecasted time interval elasticity and the forecasted net staffing to calculate in real-time a combination of incentives of each tier of the tier incentive structure in the incentive budget to accommodate understaffed time intervals and maximize agents demand for time intervals based on forecasted degree of elasticity of the time interval.

According to some embodiments, the method may include a model training phase. During the model training phase, the mode may be provided with some additional scenarios, which will be a subset of the training data, to assess the level of accuracy. The results may be checked to determine the level of accuracy and if it is not sufficient, additional training data will be provided to the model.

Figure 2A:
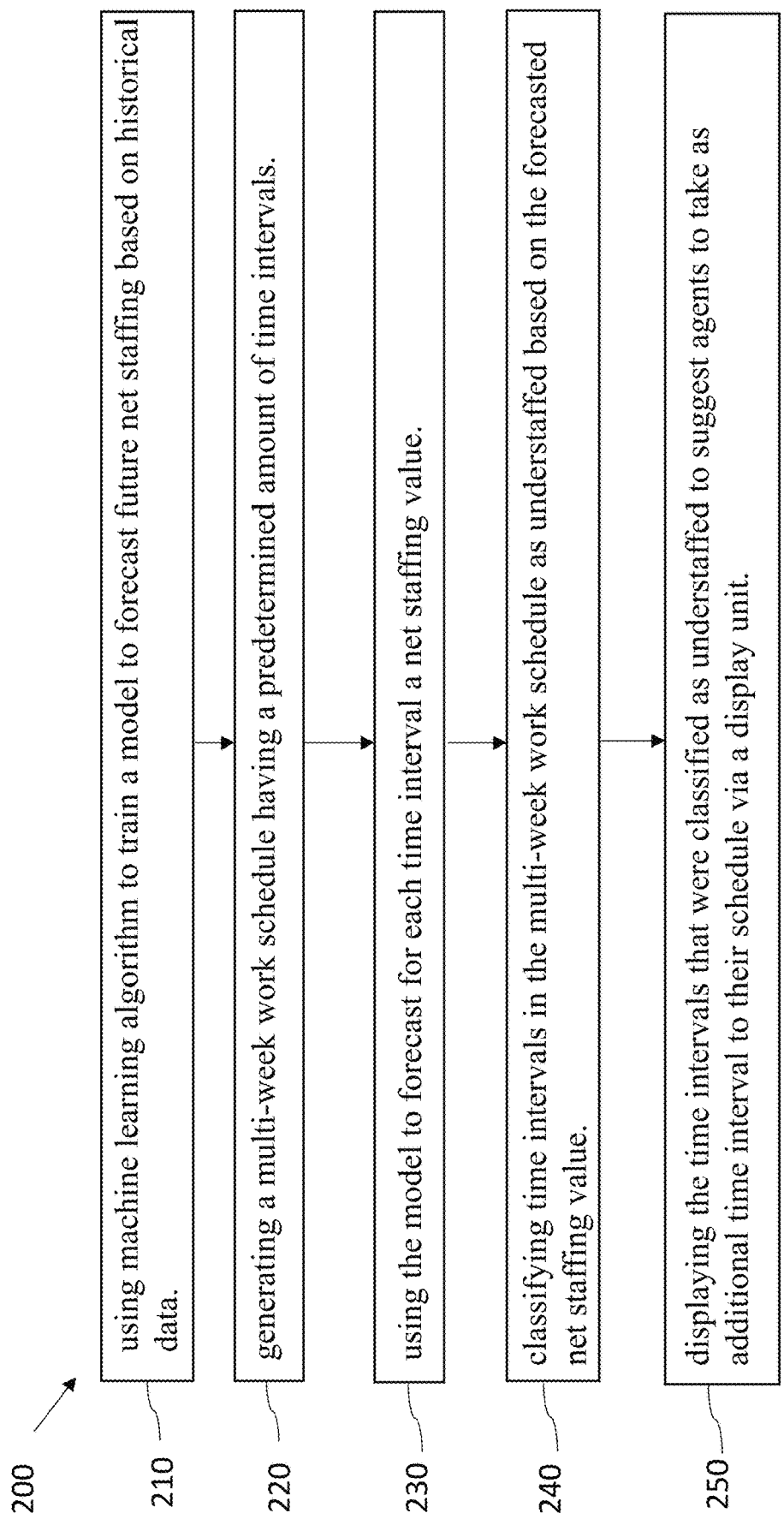
FIGS. 2A-2B illustrate a schematic flowchart depicting a method 200 for optimizing distribution of an incentive budget for additional time interval allocation in a multi-week work schedule, in accordance with some embodiments of the present invention.
Figure 2B:
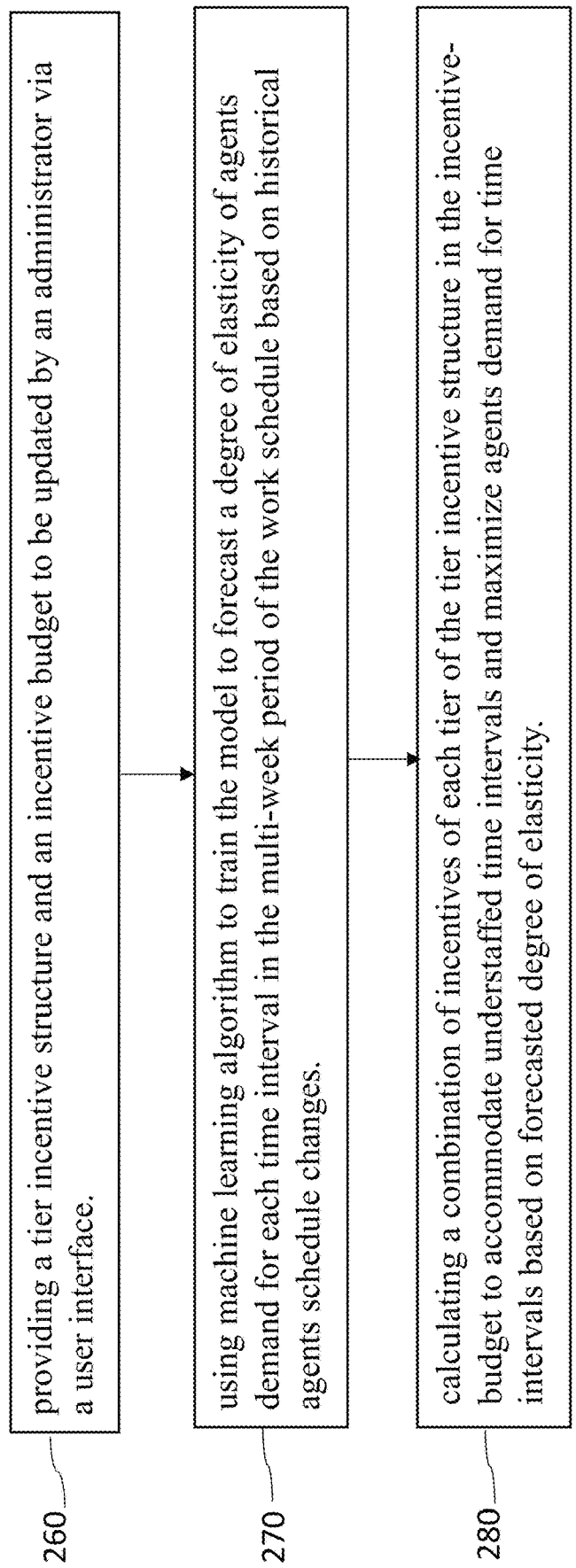

FIGS. 2A-2B illustrate a schematic flowchart depicting a method 200 for optimizing distribution of an incentive budget for additional time interval allocation in a multi-week work schedule, in accordance with some embodiments of the present invention. Method 200 may be executed by a processor of a computerized system.

Method 200 may comprise operation 210, which includes using machine learning algorithms to train a model to forecast future net staffing based on historical data.

In some embodiments of the present invention, WFM module which is connected to WFM database 10 and operating on customer (call center) platforms may predict the net staffing value in the call center based on historical data.

Method 200 may comprise operation 220, which includes generating a multi-week work schedule having a predetermined amount of time intervals. For example, when each time interval equals 30 minutes, there would be 48 time intervals per day and 336 time intervals per week.

Method 200 may comprise operation 230, which includes using the model to forecast for each time interval a net staffing value.

Method 200 may comprise operation 240, which includes classifying time intervals in the multi-week work schedule as understaffed based on the forecasted net staffing value.

In some embodiments of the present invention, tables in databases 10 and 30 may be used to store the historical data. At the time of the model training 210 the processor may be provided with information such as forecasting and staffing information across a multiple-week period (e.g. 4-weeks) and what that data equates to each day over a larger period of time months (e.g., 3 months). Additional data such as time horizon and date/time may be received to provide context to the model. E.g. predictions for future net staffing of January 28$^{th}$ may be made by feeding the model data originally received on January 1$^{st}$, then January 2$^{nd}$, etc. until the 28$^{th}$. This would mimic each passing day and the changes to net staffing for the 28$^{th}$ that would have occurred over those 4 weeks. This will be repeated for the majority of the 336 intervals (2×24×7) each week across a 3-month period. The time intervals that were not used in creating the initial model will be used for model training to ensure accuracy. Thus, the received data, may allow the model to predict the result each step of the way and correct itself where it has inaccuracies.

According to some embodiments, the forecasted net staffing value (e.g., for the last three months, for example) may be relayed to the EEM module. Furthermore, WFM module may also relay schedule time intervals that were classified as understaffed to EEM module.

Method 200 may comprise operation 250, which includes displaying the time intervals that were classified as understaffed to suggest agents to take as additional time interval to their schedule in a display unit. The display unit may be an agent mobile device.

In some embodiments of the present invention, the computerized system may communicate with an agent mobile interface i.e., one or more agent mobile interfaces, such as a cellular phone, smartphone, or tablet. As depicted in more detail in FIG. 5 below.

Method 200 may comprise operation 260, which includes providing a tier incentive structure and an incentive budget to be updated by a user a user interface. The user (e.g., an administrator or a manager) may input data related to the frame of the incentive budget, the number of tiers in the tier incentive budget and the value of each tier in the tier incentive structure. The data may be inserted via a user interface or a web interface. As depicted in more detail in FIG. 3 below.

Method 200 may comprise operation 270, which includes using machine learning algorithms to train the model to forecast a degree of elasticity of agents demand for each time interval in the multi-week period of the work schedule based on historical agents schedule changes. The model will receive data related to the time interval such as the day in the week, the time in the day, the number of agents staffed, the number of agents that were required the incentive and the like. The model will further receive additional data such as time horizon and date/time to provide context to the model.

According to some embodiments, the model 100 will work by using regression to find patterns across the variables. This will follow regression analysis models to calculate the relationship between each of the input variables and the output variable which will be net staffing (i.e., requirements—staffed). After the model is trained, the input will consist of the same variables as in the training stage and the output will consist of a net staffing; forecast.

According to some embodiments, the model 100 will simulate various incentive combinations in order to predict the elasticity of each time interval and prioritize the time intervals accordingly.

Method 200 may include calculating 280 a combination of incentives of each tier of the tier incentive structure in the incentive budget to accommodate understaffed time intervals and maximize agents demand for time intervals based on forecasted degree of elasticity. The combination is calculated to achieve the greatest change in expected forecast with the incentive budget.

Without the embodiments of the present invention as taught herein, optimized distribution of incentive budget for additional time interval allocation in a multi-week work schedule, for example, in a typical call center would need to be performed manually. However, commonly there are approximately a thousand employees in a call center. Therefore, processing big data such as the forecasting of the data related to both staffing and elasticity of each time interval in a work schedule to (i) allot the incentive budget in a distributed manner rather than in a concentrated manner; and (ii) keep incentives from being wasted on either time intervals that agents would have taken even without the incentive or time intervals with low elasticity where agents demand is not likely to change due to increase in the level of incentive, in real-time, would be impossible.

Therefore, the embodiments taught herein are a computer-based technology improvement for automatically optimizing the distribution of an incentive budget for a work schedule by the processor where the incentive budget is spent only on time intervals which are otherwise hard to fill i.e. to staff. The incentive budget is considered to be best used when it achieves the greatest change in expected forecast with the incentive budget.

The embodiments taught herein, provide an optimized distribution of the incentive budget for a work schedule and over time, after the model is trained, even decreasing its exploitation to a portion only or even not having it utilized at all and at the same time aligning business priorities with agents' priorities. In other words, having business priorities which are staffing understaffed time interval at lower cost of incentives if any, aligned with agents' priorities thus contributing to their engagement and satisfaction.

Figure 3:
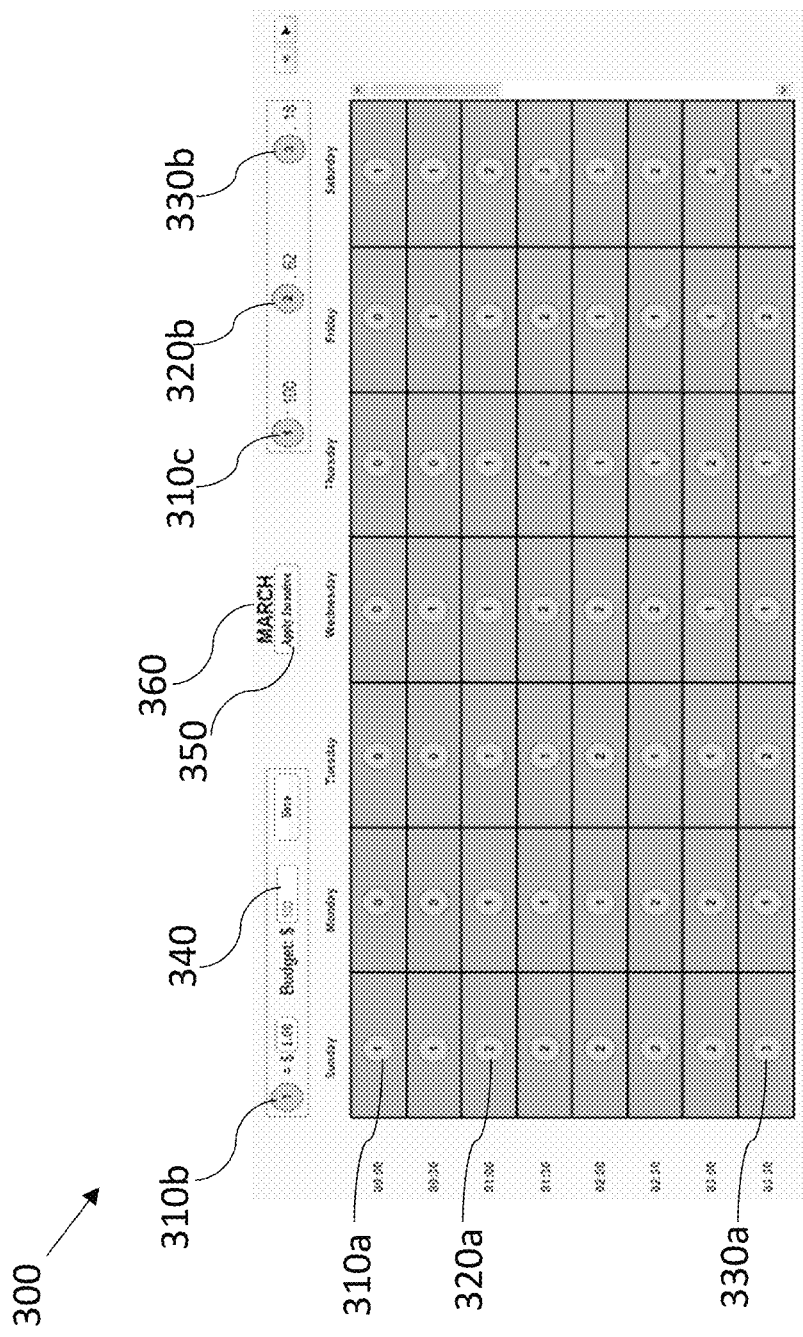
FIG. 3 is a screenshot depicting a user interface or a web interface, in accordance with some embodiments oldie present disclosure.

FIG. 3 is a screenshot depicting a user interface or a web interface, in accordance with some embodiments of the present disclosure. The user interface 300 displays a work schedule of a predefined period, in a non-limiting example for the month of March 360. A user, commonly an administrator or a manager may input via the user interface or web interface 300 the incentive budget frame 340 which was determined for example to 500 USD and the number of tiers in the incentive budget (not shown). The user may also input the value of the first tier. In a non-limiting example, the value of tier "1" was determined by the user to be 1 USD 310b. Even though the screenshot depicts three tier levels: "1" 310a "2" 320a and "3" 330a there may be other numbers of tier levels.

According to some embodiments, the value of the other tiers may be calculated based on the value of the first tier. In a non-limiting example, the second tier may be two times the value of the first tier, etc.

According to some embodiment, after the user clicks on the "apply incentive" button 350, the processor may calculate in real-time a combination of incentives of each tier of the tier incentive structure within the incentive budget to accommodate understaffed time intervals and maximize agents demand for time intervals based on forecasted degree of elasticity of the time interval.

According to some embodiments of the disclosure, the calculated combination of incentives is displayed on the user interface or web interface. For each time interval presented, the tier level that has been calculated by the processor e.g., 1" 310a, "2" 320a and "3" 330a is presented. In a non-limiting example, the calculated tier for the time interval on a specific Sunday between 00:00 AM to 00:30 AM is "1" 310a, the calculated tier for the time inter al on the specific Sunday between 01:00 AM to 01:30 AM is "2" 320a and the calculated tier for the time interval on the specific Sunday between 03:00 AM to 03:30 AM is "3" 330a.

According to some embodiments of the disclosure, the amount of each tier in the tier structure is also presented. In a non-limiting example, tier "1" has been distributed by the processor to 100 time intervals 310c in the work schedule, tier "2" has been distributed to 62 time intervals 320b and tier "3" has been distributed to 18 time intervals 330b. Once the incentive budget allocation is confirmed by the user (e.g., the administrator or the manager), agents will see via the EEM module or application the incentivized time intervals.

According to some embodiments of the disclosure, the processor may continue to train the model to accurately forecast a degree of elasticity of agents demand for each time interval in the multi-week period of the work schedule based on agents schedule changes with the addition of incentives.

Figure 4:
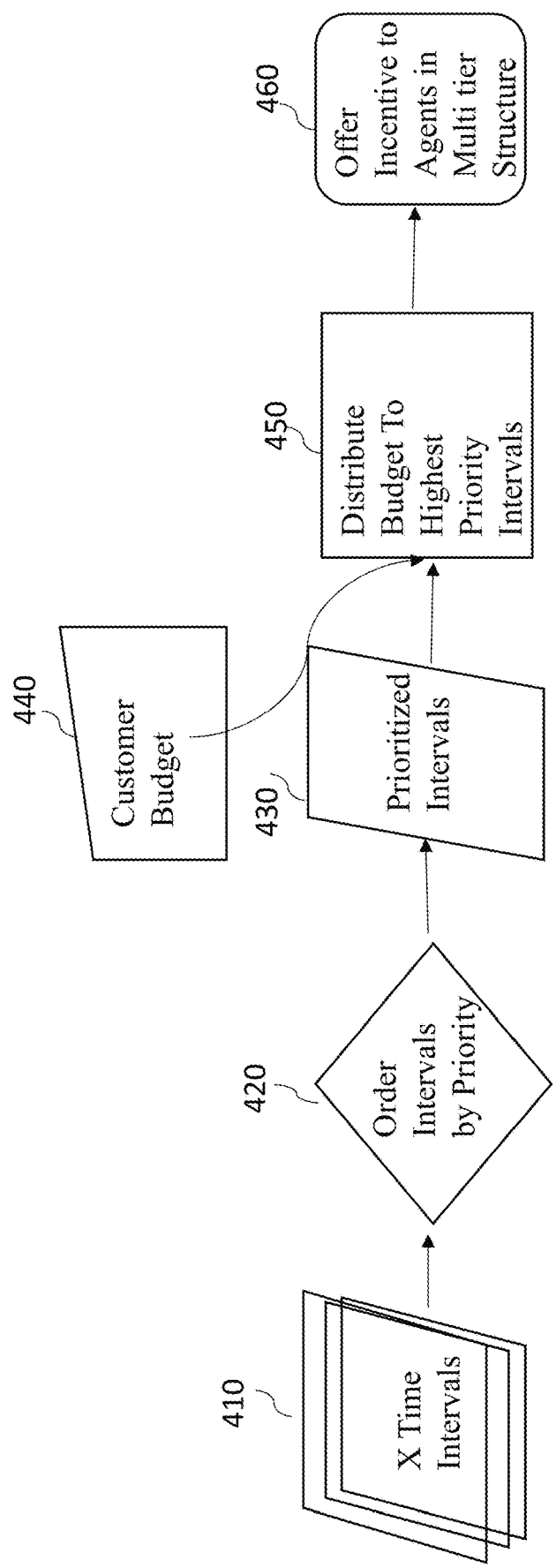
FIG. 4 is a flowchart depicting a method 400 for optimizing distribution of incentive budget for additional time interval allocation in a multi-week work schedule, in accordance with some embodiments of the present invention.

FIG. 4 is a flowchart depicting a method 400 for optimizing distribution of incentive budget for additional time interval allocation in a multi-week work schedule, in accordance with some embodiments of the present invention. In step 410, the processor may use a predefined number of time intervals 410 e.g., 48 (no. of time intervals per day) ×7 (days)=336 (total), to prioritize the time intervals according to the forecasted net staffing value 420. The prioritized time intervals 430 and the customer incentive budget 440 may be used to distribute budget to highest priority intervals 450 and later to offer incentives to agents in multi-tier structure format 460. e.g., vie EEM platform.

Figure 5:
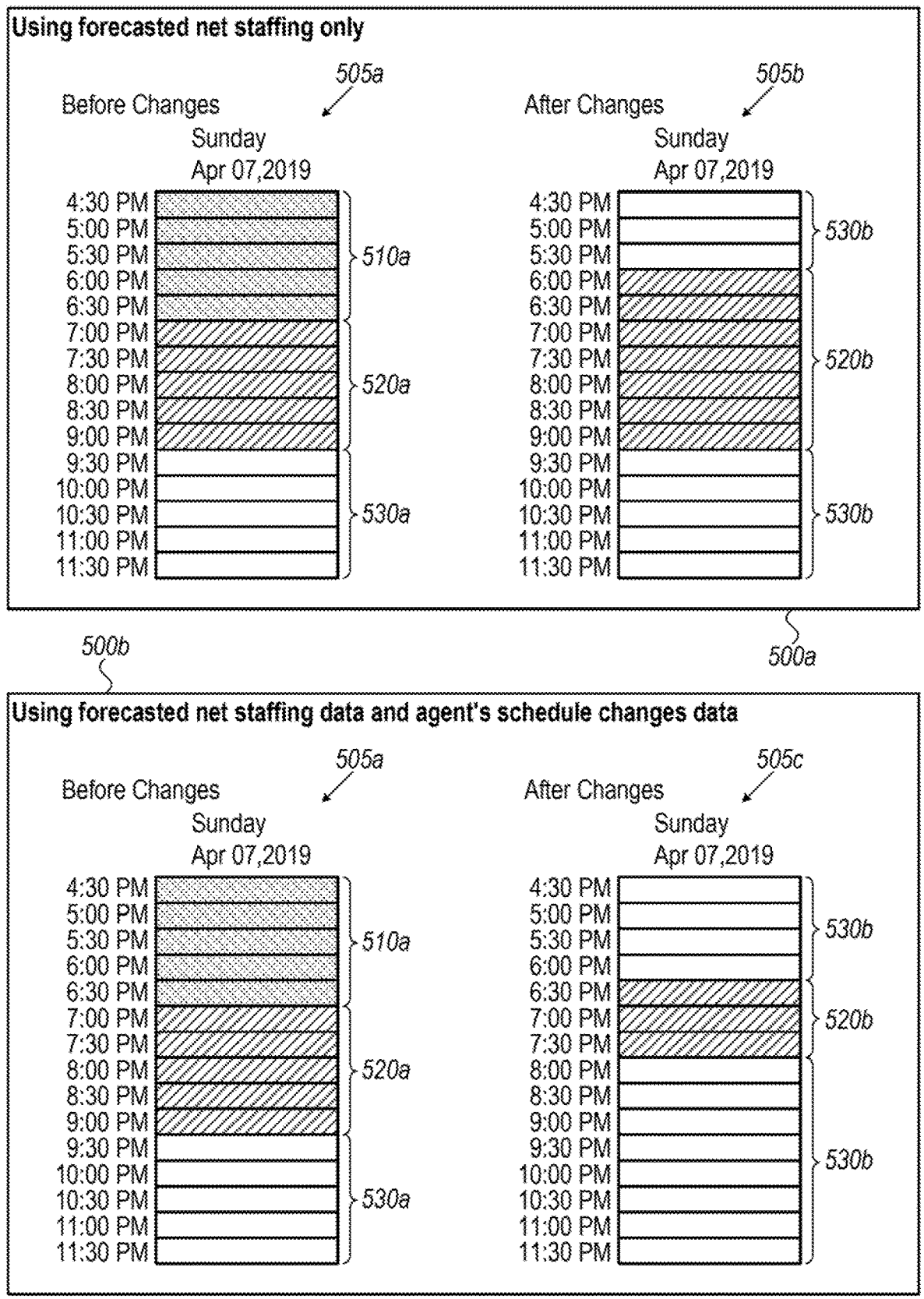
FIG. 5 illustrates multiple snapshots depicting a user interlace or a web interface that is displaying marked time intervals in a work schedule to the agents, in accordance with some embodiments of the present disclosure.

FIG. 5 shows multiple snapshots depicting a user interface or a web interface that is displaying marked time intervals in a work schedule to the agents, in accordance with some embodiments of the present disclosure. The user interface or web, interface may be connected to the an EEM platform. Table 500a shows the change in the marked time intervals of work schedule 505a after distributing incentive budget based on current net staffing value only, to work schedule 505b. In work schedule 505a the time intervals are classified to three levels of staffing. Staffing level 510a designates time intervals which are pre-approved i.e. automatically allowed to select as additional time intervals by the administrator or manager for agents because WFM module forecasted them as highly understaffed. Staffing level 520a designates time intervals which requires approval from the administrator or manager to select as additional time intervals for agents because WFM module forecasted them as understaffed. Staffing level 530a designates time intervals which are not open for selection as additional time intervals for agents because WFM module forecasted them as adequately staffed or overstaffed.

According to some embodiments, after applying incentive budget distribution based on net staffing value only, the outcome may be work schedule 505b. In work schedule 505b staffing level 510a has been eliminated and the amount of time intervals in staffing level 520a has been changed to the amount of time intervals in staffing level 520b. Staffing level 530a which designates time intervals which are adequately staffed has been changed to the amount of time intervals in staffing level 530b. Table 500a shows time intervals that would have been selected by agents without incentive in 505a being incentivized and resulting 505b in a shift from very understaffed 510a+520a in 505a to moderately understaffed 520b in 505b.

Table 500b shows the outcome of the change in the marked time intervals of work schedule 505a after distributing incentive budget based on net staffing value and agents demand to illustrate outcome work schedule 505c.

According to some embodiments, when applying the method of the current disclosure, the outcome work schedule 505a when taking into consideration net staffing value and schedule changes data may outcome work schedule 505c. In comparison to work schedule 505b, the amount of time intervals in staffing level 520b has been shrunk and the amount of time intervals in staffing level 530b has been increased. Table 500b shows that when applying the method of the current disclosure, the resulting shift goes from very understaffed 505a which includes 510a+520a to only slightly understaffed in 505c Which includes only 520b.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments: thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computer-implemented method for optimizing distribution of an incentive-budget for additional time interval allocation in a multi-week work schedule, the computer-implemented method comprising:
   in a Workforce Management System (WFM) application, using machine learning algorithm to train a WFM model to forecast future net staffing based on historical data, wherein the historical data is stored in a WFM database that is associated to the WFM application;
   using the WFM application to operate the trained WFM model to:
   (i) generate a multi-week work schedule having a predetermined amount of time intervals;
   (ii) forecast for each time interval a net staffing value;
   wherein the WFM model is trained to calculate a relationship between input variables and the forecasted net staffing value;
   (iii) classify time intervals in the multi-week work schedule as understaffed based on the forecasted net staffing value; and
   (iv) rely the classified time intervals in the multi-week work schedule as understaffed to an Employee Engagement Manager (EEM) platform,
   providing a tier incentive structure and an incentive-budget for additional time interval allocation in a multi-week work schedule to be updated by a user via a user interface of a work schedule of a predefined period;
   using machine learning algorithm to train an EEM model in the EEM platform to forecast a degree of elasticity of agents demand for each time interval in the multi-week period of the work schedule based on historical agents schedule changes;
   using the EEM platform to operate the trained EEM model to forecast a degree of elasticity of agents demand for each time interval in the multi-week period of the work schedule;
   calculating a combination of incentives of each tier of the tier incentive structure in the incentive-budget for additional time interval allocation in a multi-week work schedule to accommodate the time intervals in the multi-week work schedule classified as understaffed and maximize agents demand for time intervals based on the forecasted degree of elasticity of agents demand for each time interval in the multi-week period; and
   using the EEM platform to display, via a display unit that is associated to the user interface of the work schedule of the predefined period, (i) the time intervals that were classified as understaffed, to suggest agents to take as additional time interval to their schedule and (ii) the calculated combination of incentives of each tier,
   thus, optimizing the distribution of incentive-budget for additional time interval allocation in the multi-week work schedule.

2. The method of claim 1, wherein the historical data comprises of monitored agents schedule changes over predetermined number of weeks or net staffing value.

3. The method of claim 1, the method further using the EEM model to simulate various incentive combinations of incentives from each tier of the tier incentive structure in the incentive-budget to further train the model to determine degree of the elasticity of agents demand for a time interval in the multi-week period.

4. The method of claim 1, the method further using the EEM model to simulate various incentive combinations of incentives from each tier of the tier incentive structure in the incentive-budget to select the combination of incentives of each tier of the tier incentive structure that will achieve the greatest change in expected forecast.

5. The method of claim 4, wherein the incentive-budget is not fully exploited.

6. The method of claim 5, wherein the incentive-budget is not utilized.

7. The method of claim 1, the method further comprising offering to agents to elect incentivized time intervals according to the calculated combination of incentives via the user interface of the work schedule of the predefined period.

8. The method of claim 7, the method further comprising adding the agents schedule changes due to the offered incentivized time interval to the historical data.

* * * * *